United States Patent [19]

Newell

[11] Patent Number: 5,227,228

[45] Date of Patent: Jul. 13, 1993

[54] SORPTIVE ARTICLE COMPRISING ELEMENTS HAVING CAPACITIVE SPACES FOR FLUID AND/OR PARTICULATE SOLIDS

[76] Inventor: Robert D. Newell, 429 N. Main St., Roxboro, N.C. 27973

[21] Appl. No.: 793,854

[22] Filed: Nov. 18, 1991

Related U.S. Application Data

[63] Continuation-in-part of Ser. No. 471,110, Jan. 26, 1990, Pat. No. 5,066,527, which is a continuation-in-part of Ser. No. 189,484, May 2, 1988, Pat. No. 4,923,738.

[51] Int. Cl.$^5$ ............................................. D03D 3/00
[52] U.S. Cl. ................................. 428/224; 428/102; 428/229; 428/152; 428/283; 428/284; 428/288; 428/294; 428/299; 428/369; 428/903; 428/913
[58] Field of Search ................ 428/294, 913, 224, 229, 428/299, 369, 903, 152, 102, 283, 284, 288

[56] References Cited

U.S. PATENT DOCUMENTS

| | | | |
|---|---|---|---|
| 891,744 | 6/1903 | Stocker | 300/21 |
| 1,783,795 | 12/1930 | Kenner | 15/229.1 |
| 1,855,400 | 4/1932 | Krebs | 15/229.1 |
| 1,936,433 | 11/1933 | Jumoville | 15/208 |
| 1,993,215 | 5/1935 | Hoyt et al. | 300/21 |
| 2,035,130 | 3/1936 | Klawans | 300/21 |
| 2,230,101 | 1/1941 | Backemeier | 15/120.2 |
| 2,231,272 | 2/1941 | Klawans | 300/21 |
| 2,300,821 | 11/1942 | Weaver et al. | 300/21 |
| 3,115,658 | 12/1963 | Moss | 15/229 |
| 3,324,497 | 6/1967 | Moss | 15/229.2 |
| 3,453,677 | 7/1969 | Cutler | 15/104.94 |
| 3,520,017 | 7/1970 | Moss | 15/229 |
| 3,565,077 | 2/1971 | Glick | 606/231 |
| 3,827,099 | 8/1974 | Allaire et al. | 15/229 |
| 4,114,224 | 9/1978 | Disko | 15/229 |
| 4,227,277 | 10/1980 | McNellwy, Jr. | 15/229 |
| 4,313,774 | 2/1982 | Arthur | 156/73.1 |
| 4,391,872 | 7/1983 | Suzuki et al. | 428/400 |
| 4,717,616 | 1/1988 | Harmon et al. | 428/195 |
| 4,750,234 | 6/1988 | Quearry et al. | 15/229.1 |
| 4,752,958 | 6/1988 | Quearry et al. | 15/229 |
| 4,923,738 | 5/1990 | Newell | 428/221 |
| 4,995,133 | 2/1991 | Newell | 15/229.001 |
| 5,066,527 | 11/1991 | Newell | 428/35.6 |

FOREIGN PATENT DOCUMENTS

924880 8/1947 France.

OTHER PUBLICATIONS

"White Floor Mopping Equipment and MIpro Waste Receptacles Price List, Effective: Jan. 15, 1986" product brochure of White Mop Wringer Co., P.O. Box 277, Riveside Drive, Fultonville, N.Y. 12072.

"New Dispenser Package Massilinn TM Cleaning Cloth", Chicopee, New Brunswick, N.J.

"More Than Just a Source", Wilen Manufacturing Company, Atlanta, Ga. 30315.

"Pig Almanac/Taking Cleanliness to New Heights," vol. III, No. 1, Jan., 1990 New Pig Corporation, Tipton, Pa. 16684.

"Cotton/Growth in Nonwovens, Naturally," Nonewovens Industry, Jun. 1989, pp. 26–30.

"Fibers for Nonwovens/Another Record Year for Stable Shipments," Harrison, D. Nonwovens Industry, Jun., 1989, pp. 20–24.

"Monhan's Miraculus Mopster TM /the mop yarn of the 90's." The Monahan Co.

"One System . . . System 1 TM /The Flat Mopping Concept," Wilen Manuf. Company, Ga.

Primary Examiner—James J. Bell
Attorney, Agent, or Firm—Steven J. Hultquist

[57] ABSTRACT

A sorptive article comprising an assemblage of fibrous web elements. The assemblage may be intrinsically consolidated by intertwining, melt-bonding, or otherwise aggregating the web elements themselves, or else by extrinsic consolidating means, e.g., filaments, wires, clips, clamps, adhesive media, etc. The sorptive article is usefully employed for selective pick-up and retention of fluids (liquids) and/or particulate solids.

20 Claims, 5 Drawing Sheets

SORPTIVE ARTICLE COMPRISING ELEMENTS HAVING CAPACITIVE SPACES FOR FLUID AND/OR PARTICULATE SOLIDS

CROSS-REFERENCE TO RELATED APPLICATIONS

This is a continuation-in-part of U.S. application No. 07/471,110 filed Jan. 26, 1990 in the name of Robert D. Newell, and issued Nov. 19, 1991 as U.S. Pat. No. 5,066,527, which in turn is a continuation-in-part of U.S. application No. 07/189,484 filed May 2, 1988 in the name of Robert D. Newell, and issued May 8, 1990 as U.S. Pat. No. 4,923,738.

BACKGROUND OF THE INVENTION

1. Field of the Invention

This invention relates generally to an article capable of taking up fluid and/or particulate materials, and more specifically to an absorbent casingless article that may be used to take up and contain fluids and/or particulates.

2. Description of the Related Art

Absorbent socks formed of polyester and containing either cellulose in a free-flowing particulate form or containing particles of magnesium aluminosilicate or other particulate materials have been used to absorb and contain oils and non-aggressive fluids (e.g., the absorbent articles commercially available under the trademark PIG ® and PIG ®mat, from New Pig Corporation, Tipton, Pa.). Although such absorbent socks provide a contained, efficient way of absorbing hydraulic fluids, PCB's, and other substances to be cleaned from an environment, they also contain particulate inner material that may cause a problem of excessive dust and require use of a dust mask if a spillage from the sock occurs. In addition, such sorptive articles are limited in utility to fluids, and have little or no ability to pick up and retain solid particulates.

Other prior measures for absorbing leaked or spilled fluids have utilized clay, towels, buckets or cans. The problem with each of these methods relates to the difficulty and/or the expense of handling the oil-containing material or the container. Substances such as clay also have a lower absorbency than the materials used in the commercial PIG ® and PIG ®mat products.

It is well known that many fibrous or fabric substances absorb liquids to some extent. Such substances as cotton fiber and natural cellulose products absorb liquid more efficiently than many man-made fibers, e.g., melt-blown fibers, which cannot absorb water at all, but rather must rely on their capillary reaction to liquids. Thus, such synthetic fibrous yarns must be sufficiently porous to permit the moisture to diffuse between the fibers and be held between the fibers in a cleaning manner. These synthetic fibers, however, are often preferred for many other uses because of their strength, their high wearability and their limited shrinkage.

Desirable characteristics of fibrous webs or fibrous structures in enhancing fluid absorption include: high durability and resistance to abrasion; high absorption characteristics such as are shown by soft, loosely twisted yarns; ready dryability; fast drying; easy wringability; high wet tensile strength; and the ability to withstand repeated laundering without shrinking significantly.

In respect of particulate solids pick-up, retention, and release, a variety of fibrous or fabric-based materials are employed. Fibrous webs or fibrous structures used for such purpose should have the ability to achieve rapid pick-up of solids and release thereof upon shaking or liquid (water) immersion, and should also be resistant to charge effects such as may result in minimal particulate solids pick-up and/or retention efficiency.

U.S. Pat. No. 4,717,616, issued Jan. 5, 1988, to Harmon, discloses a mop head fabric construction that comprises a plurality of substantially parallel, abutting strands of textile material such as cords of twisted strands or yarns. Absorption in this product is accomplished through the use of capillary action exhibited by the very finely divided fibrous structures which possess a low fluid pick-up and retention capacity per unit volume, thereby physically limiting the amount of fluids that can be absorbed. These fibrous structures are limited in absorption capacity because of their large surface area per unit volume retained, and the wringability and dryability of these fibers.

U.S. Pat. No. 4,995,133, issued Feb. 26, 1991, to Newell, discloses a mop head comprising a plurality of web elements having involutions therein. The involutions may be formed by treatment conditions comprising successive tensioning/detensioning, compression, differential stressing of stretching, twisting, or combination of these or other conditions or treatments imparting involutions to the web elements. In one aspect, the web elements are formed of a non-woven material comprising a cellulose and synthetic fiber blend. The mop head utilizes the discovery that interstitially capacitive regions may be employed to contain liquids and/or fluids or mixtures of fluids and particulates within a three-dimensional framework, e.g., fabric structure, which is capable of retaining the fluids by surface tension forces and capacitance of the structure of the fabric. These capacitive interstitial regions of the sorptive structures of the invention of U.S. Pat. No. 4,995,133 also are desirable in that they release fluids and/or solid particulates more easily than conventional absorptive materials due mainly to the small structural surface area required to contain a droplet of liquid or fluid and/or solid particle in the fabric or sorptive structure of the invention.

It would be a significant advance in the art of sorptive articles to provide a sorptive article having increased sorptive efficiency, providing easy fluid and/or particulate solid take-up, retention, and release and which may be used and reused without the need for an outer skin/container to maintain the integrity of the sorptive article.

OBJECTS AND SUMMARY OF THE INVENTION

It is therefore an object of the present invention to provide an improved sorptive article having utility for sorption of diverse liquids or fluids and/or solid particulates.

It is a further object of the invention to provide a sorptive article that may be of an elongated form or otherwise of a suitable shape or conformation to surround and contain spills of fluids on floor surfaces and/or water or other fluid surfaces.

It is a further object of the invention to provide a sorptive article from which fluid and/or particulate solids may be easily released.

Another object of the invention is to provide a sorptive article that may be reused.

Yet another object of the invention is to provide a sorptive article that can be made of waste fibrous web materials, such as trim waste or other waste or by-product fibrous web materials.

One form of the invention comprises an assemblage of fibrous web sorptive elements having capacitive spaces capable of holding fluids and/or particulate solids, and comprising a means or arrangement for imparting a unitary or consolidated structural character to the assemblage of fibrous web sorptive elements.

The fibrous web elements may be involuted, entangled, twisted, or curvate strands, sheets, pieces and/or fibers of a nonwoven or woven fibrous web material.

The retaining means used to maintain the sorbent elements in a unitary product article form include, for example, cord, strands, and filaments. The retaining means may be used alone or may be used to attach the fibrous web elements to yoke or support member(s). Alternatively, such retaining means may comprise adhesive spot bonding retaining means, whereby the individual sorptive elements are aggregated to one another to form a coherent mass.

Preferred forms of the sorptive article, as well as other embodiments, objects, features and advantages of this invention, will be apparent from the following detailed description of illustrative embodiments thereof.

DETAILED DESCRIPTION OF THE INVENTION, AND PREFERRED EMBODIMENTS THEREOF

The disclosure of parent application No. 07/471,110 filed Jan. 26, 1990 hereby is incorporated herein by reference in its entirety, including FIGS. 1-10 thereof. It is specifically to be appreciated that the sorptive articles of such prior application, e.g., those shown in FIGS. 1, 2, 5, 6, 7, and 9, could be utilized in accordance with this invention in a manner lacking the casing associated with the illustrative embodiments of these drawings.

The sorptive article of the present invention comprises an assemblage of fibrous web sorptive elements having capacitive (e.g., interstitial) spaces capable of holding fluids (e.g., liquids) and/or particulate solids (including semi-solids, gelatinous materials, and other flowable or partially flowable or self-leveling materials), and a structural arrangement, or retaining or consolidating means imparting a unitary or consolidated character to the assemblage of fibrous web sorptive elements, whereby the aggregate article may be used for absorbing various fluids, liquids, and/or particulate substances. Suitable retaining or consolidating structure may comprise, inter alia, convolutions or conformations of the fibrous web elements themselves, whereby the fibrous web elements may be aggregated in a matted, bunched, tufted, or intertwined manner to provide a unitary or otherwise consolidated assemblage of the fibrous web elements.

The term "fibrous web" as used herein means a nonwoven or woven fabric, the primary difference between nonwoven and woven fabrics being that in nonwoven fabrics, the individual fibers, rather than yarns, are the basic elements of the structure. Both fabric types may be used in the invention, but nonwoven fabrics are preferred because of their increased absorptive capacity (per volume of weight with less density), particularly when treated as described in U.S. Pat. No. 4,955,133, and because of their generally lower costs than those associated with woven fabrics. The fibrous web materials may be porous or nonporous.

Nonwoven fabrics consist essentially of fibers, web and binder. The fibers are typically of rayon, nylon, polyester, polypropylene, cotton, wood pulp, olefin, fiberglass or any other long (filament) or short (staple) fibers. The web may be carded, wet, dry, or air formed, air dispersed, melt blown or spunbonded. The binders known in the art include latex, low-melt fibers, powders, thermally responsive substances, composites and needlepunched substances, as well as other chemical, polymer, and stitchbond binders.

The types of nonwoven bonding systems include adhesive systems, such as melt blown processes where tacky, melted, extruded polymer fibers come in contact with other fibers and stick together; use of chemicals, such as acrylates, in chemical systems such as saturation, and foam or spray bonding; methods using air-pressure and heat, typically used with melted adhesion fibers; needlepunching, where fibers are physically entangled; solvent treatment to make fibers sticky; sonic energy treatment to heat or melt fibers; and water entanglement ("spunlace") where the force of water and/or air streams is used to entangle the fibers.

Fibrous web materials that may be used include those made of natural fibers, synthetic fibers, and combinations thereof. Thus, natural nonwovens of cotton linters and cotton staple; dissolving pulp; flax, jute or ramie pulp; papermaking pulp or wool; as well as synthetic nonwovens of acetate filament or staple; acrylic filament or staple; aramids; carbon; glass filament or staple; inorganic ceramic; modacrylic filament or staple; nylon filament or staple; polyacetal; polybenzimidazole; polyester filament or staple; polyphenylene sulfide; polypropylene filament or staple; polyvinyl alcohol; rayon filament or staple; spandex and other elastomers; specialty olefins; polyethylene; and vinyl filament and staple, are included within the nonwovens that may be used in the sorbent element of the invention.

A preferred fibrous web material comprises spun-laced nonwoven fabrics. Spun-laced fabrics may be made of precursor webs comprised of 100% polyester or rayon, polyester blends, such as with rayon or wood pulp or other synthetic or natural fibers such as acrylics or olefin or cellulosic fiber. Spun-laced fabrics comprise mechanically interlocked fibers and fiber bundles where the energy causing the fiber interlocking comes from small diameter, high pressure water streams which impinge on a web formed by carding, air laying or wet laying the fibers on a screen or forming wire. Preferred components of the web materials used in the invention are hydroentangled synthetics such as from 30% to 100%, e.g., 45%, wood pulp or rayon, and from 0% to 70%, e.g., 55%, polyester; cotton-polyester; or cellulosic-polyester.

Other nonwoven materials that may be used include air laid nonwovens, carded and random fiber nonwovens, meltblown nonwovens, needlepunched nonwovens, scrim nonwovens, spunbonded nonwovens, stitchbonded nonwovens, tow nonwovens and wet laid nonwovens.

Another type of nonwoven material that may be used as the fibrous web material comprises pieces or strips as used to make "highloft" products such as felting, padding, and thermal insulating strips, which are typically made of various cellulose and/or synthetic pulps.

In place of, or preferably mixed with, the fibrous web nonwoven material, foam materials having internal interstitial spaces may be used. Foams of cellulosic, polyolefin, polystyrene, polyurethane, and combinations thereof may be used in combination with nonwoven materials.

The fibrous web material used may be in the form of whole or partial sheets, strips or web, or chopped or shredded web pieces. Thus, in its broadest aspect, any scrap pieces of fibrous web material may be used in the present invention. Preferably, the web material is in strips 2-10 inches wide. However, any pieces of a thickness and conformation capable of forming interstitial or capacitive spaces to take up fluids may be used. It is to be understood that the choice of size and shape of the fibrous web elements must allow for the retaining or aggregating means or structure to maintain the physical integrity of the sorptive article.

Figure 1:
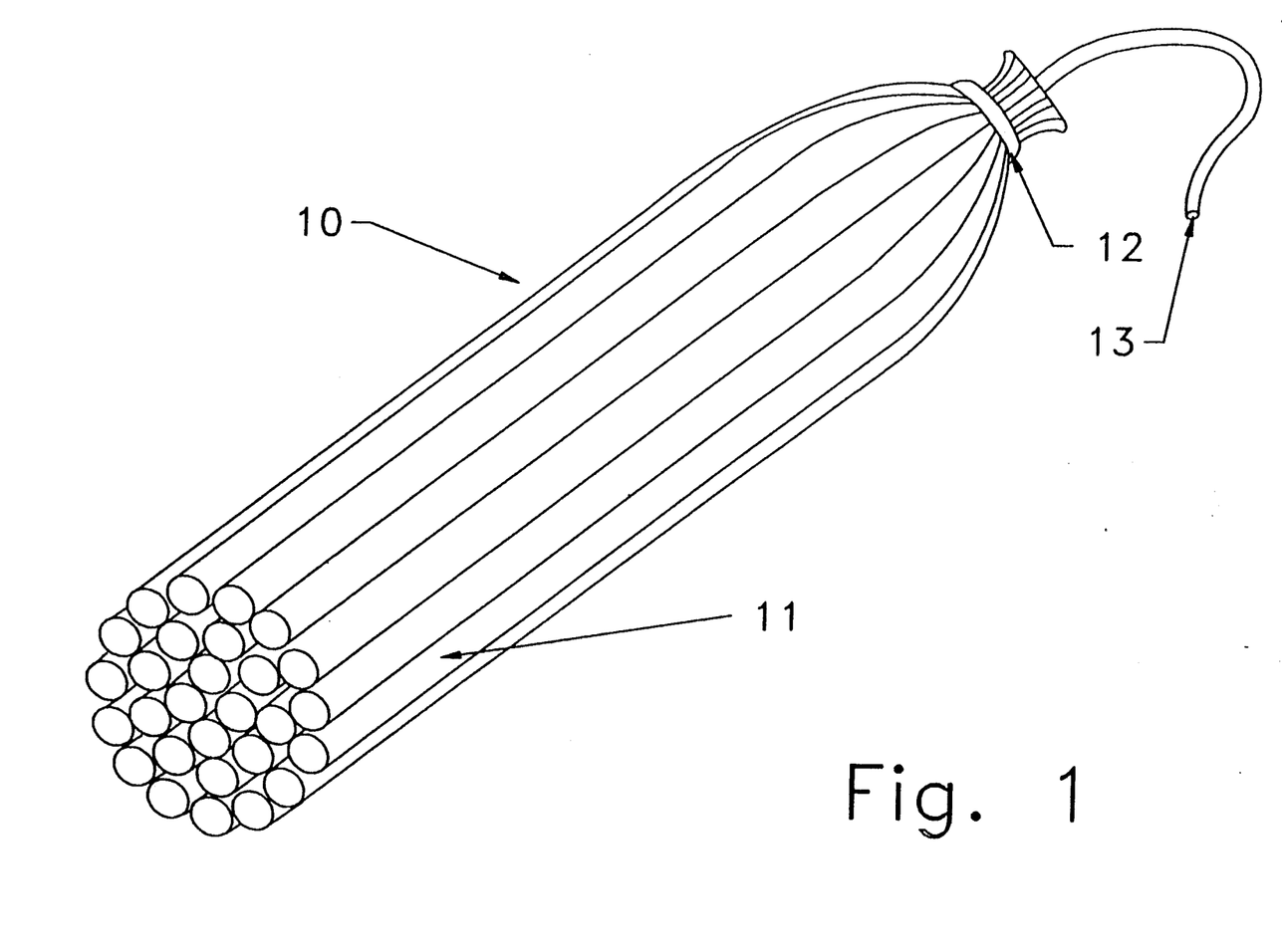
FIG. 1 is a perspective view of one end portion of one embodiment of the invention having elongated parallel or twisted fibrous web strand elements.

In one preferred embodiment of the invention, as illustrated in FIG. 1, the fibrous web elements 11, as shown, comprise a plurality of strands of web material, each of which preferably extends the entire length of the sorptive article. The strands may be roughly parallel to each other as illustrated or may be twisted, matted, snaked, or otherwise aggregated with or about one another.

Figure 3:
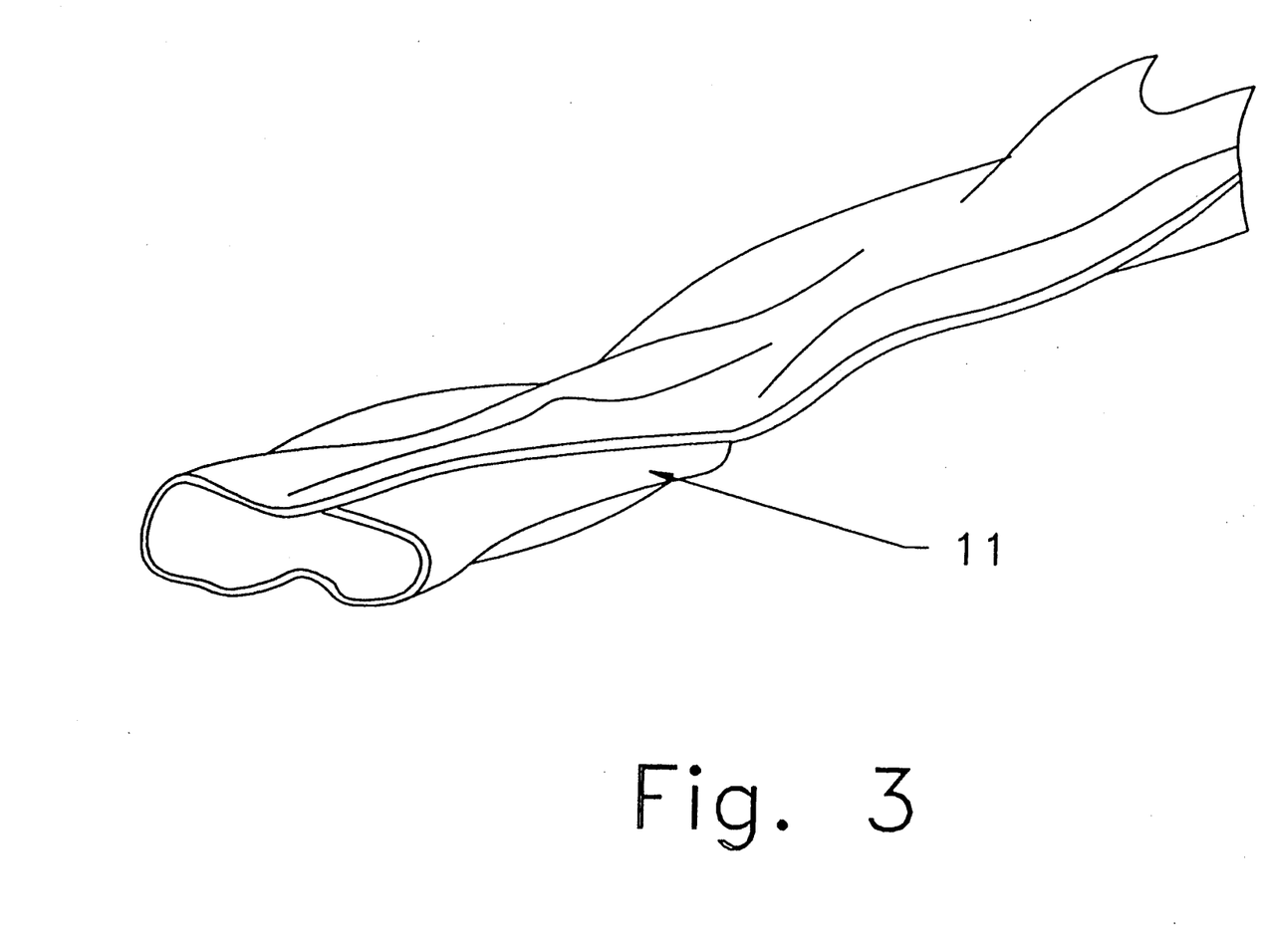
FIG. 3 is a perspective view of the end of a fibrous web strand element according to one embodiment of the invention.

Prior to consolidation by the retaining or aggregating means, each strand may suitably be treated by unidirectional stretching or twisting followed by cessation of such stretching or twisting, resulting in a continuous, laterally involuted or twisted ribbon creating structurally stable interstitially capacitive spaces, as disclosed by commonly owned U.S. Pat. No. 4,995,133, the disclosure of which hereby is incorporated herein by reference. In this respect, it is to be appreciated that any other the sorptive elements employed in the mop head structures of said U.S. Pat. No. 4,995,133 may potentially usefully be employed in sorptive articles in accordance with the present invention, and conversely, any of the sorptive articles disclosed herein may potentially usefully be employed in mop head structures of a general type as disclosed in U.S. Pat. No. 4,995,133. The unidirectional stretching usefully employed to produce fibrous web elements with capacitive regions in accordance with the present invention is preferably applied by imparting collaterally imbalanced stresses to a fibrous web so that not all portions of the web are stretched or twisted to the same extent. Such differential stretching results in formation of involutions in the web piece, so that the edges of the web roll inward, twist or gather, producing a fibrous web element of capacitive character, as illustratively shown in FIG. 3. Surface winding machines may be used to differentially longitudinally stress the web to form involutions. When the resulting, e.g., laterally involuted, structure is placed in proximity to a fluid such as water, organic solvents, oil, etc., its shape provides regions into which the fluid flows by capillarity and surface tension effects. In addition, such capacitive structures have capacity for the take-up, retention, and disengagement of particulate solids, e.g., dust particles, sub-micron aerosolized solids, grit particles produced by machining operations, etc.

Other types of stresses, as disclosed in U.S. Pat. No. 4,995,133, such as heating, use of a peening apparatus, and use of a differentially hydrophilic laminate may be used to impart collaterally imbalanced stresses to the web pieces or elements.

A plurality of such capacitive fibrous web elements 11 may be placed in a side-by-side or bundle configuration and either one or both ends of the bundle may be held together by a retaining means 12, such as for example a metal clamp. One or both of the ends of the bundle may have an attached cord or other handle means 13 attached thereto, such as by sewing or stapling, to facilitate handling and placement of the sorptive article at a spill site or other sorptive locus.

In another embodiment of the invention, the fibrous web elements 11 may suitably comprise a plurality of pieces of web material that are arranged in parallel in a stacked arrangement. The stack of pieces then is rolled to form a cylinder. Prior to rolling the stack into a cylinder, the stack may be folded one or more times to increase the number of layers being rolled together. Again a suitable retaining means 12 may be used on one or both ends of the fibrous web pieces 11.

In yet another embodiment, the sorptive element comprises a plurality of crumpled fragments, torn or chopped segments, felted web fibers, or any other fibrous web material pieces, in which the pieces of web material are not necessarily linearly aligned. The pieces of interior web material may be treated as in the first embodiment to form involutions. These pieces taken together extend from one end of the sorptive article to the other, and have interstitial spaces of sufficient size and shape to take up the liquid by capillary and surface tension effects, to enhance wicking of liquid into the interstitial spaces. Such interstitial spaces also are of sufficient size and shape to take up, and retain, particulate solids, which subsequently can be disengaged from the capacitive regions by shaking, or impact of the sorptive article on a hard surface, or immersion of the sorptive article in a suitable liquid facilitating disengagement of the particulate solids therefrom, or in any other suitable manner. It is to be appreciated that in embodiments of the invention which use pieces of fibrous web material that are not continuous from one end of the sorptive article to the other, the retaining means must bind the pieces so as to produce the complete sorptive article and maintain its shape. This may be done using retaining means such as: open mesh sleeves, bands, or other mesh retaining means; bindings comprising wire, string, filament, cord, etc.; adhesive systems; melt bonding; tray or pan structures along the lines of those employed in PIG ®pan absorbent pans (New Pig Corporation, Tipton, Pa.); retaining means such as staples or clips; spot-bonding with glue or other adhesive media; physical tying together of fibrous web elements; interpenetration of such elements; or any other suitable consolidation or aggregating means, methods and/or techniques.

Figure 2:
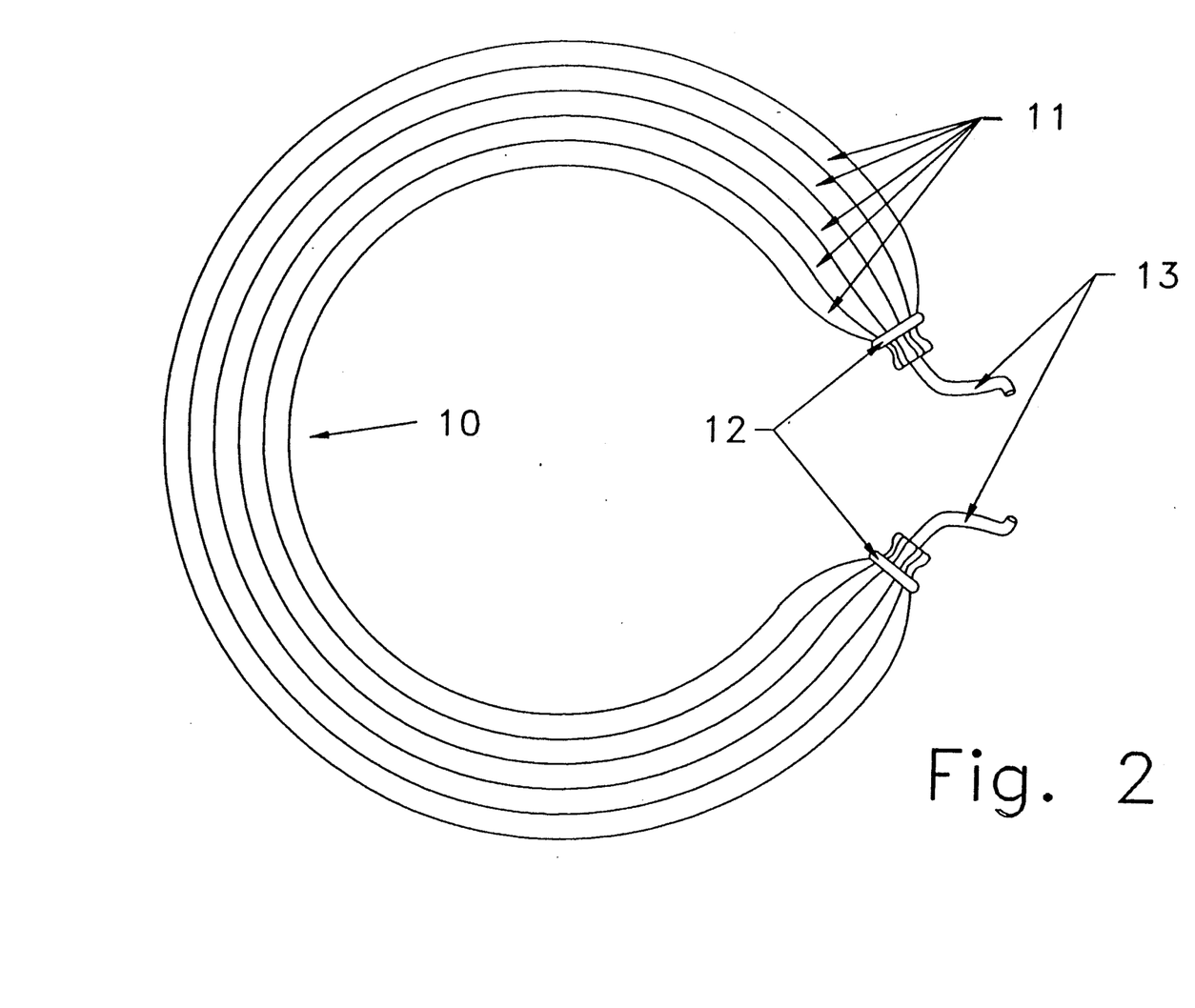
FIG. 2 is a perspective view of an elongated sorptive article of the invention placed in a manner to partially encircle a fluid to be taken up by the sorptive article.

The sorptive element of the invention may be made in any length, width, thickness, shape, configuration, conformation, or in any size or form rendering it useful for absorptive purposes. When an elongate sorptive element 10 is bent into a circular form as shown in FIG. 2, it may surround a spill area or sorptive locus. Thus, as with a cased sorptive article (such as the aforementioned PIG ® sock), the long sorptive element 10 may be placed around or adjacent to a spill or drip area to enclose the fluid or stop it from spreading.

Figure 4:
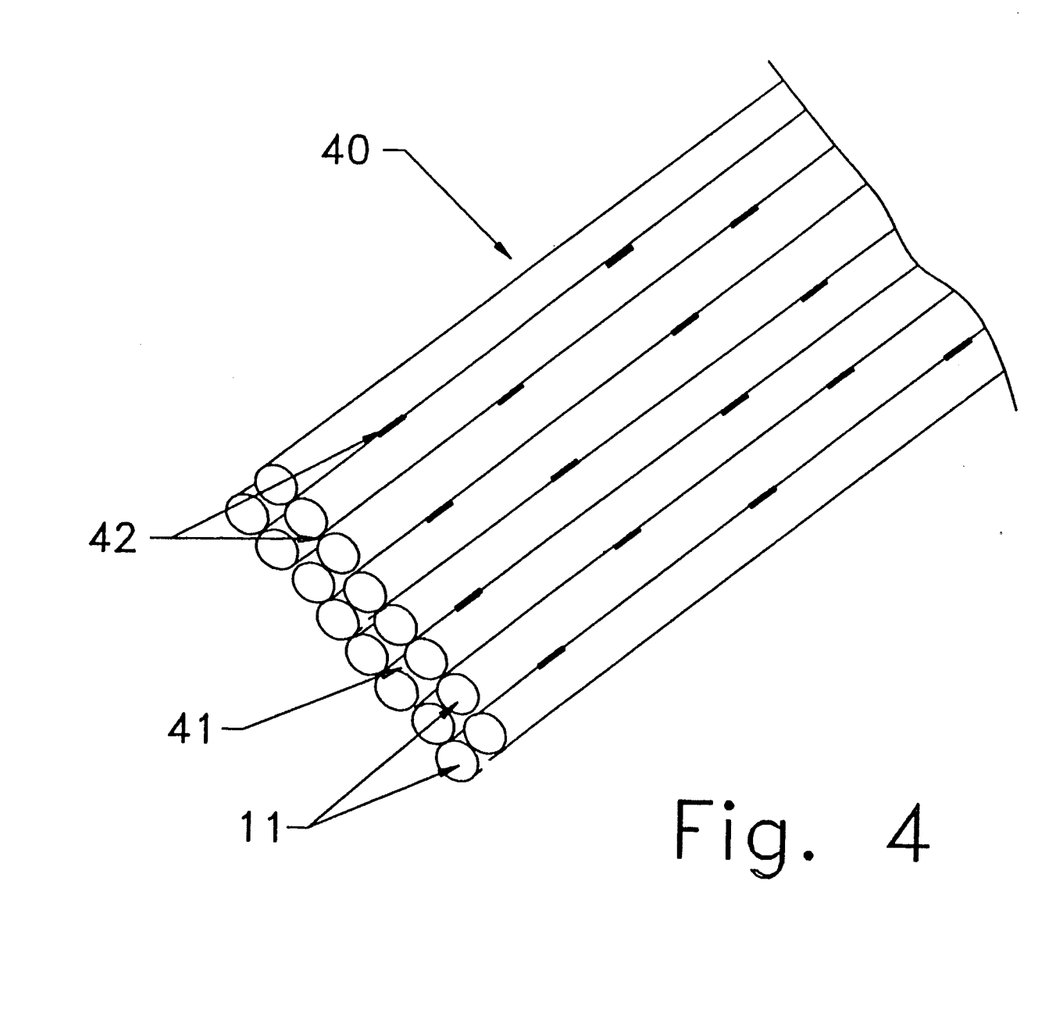
FIG. 4 is a perspective view of a portion of a flattened rectangular sorptive article embodiment of the invention.

In another embodiment of the invention as shown in FIG. 4, the fibrous web material forms a flattened sorptive article 40 which may be rectangular, rounded or any other desired shape. In this embodiment, the fibrous web material elements 11 of the sorptive article 40 are bound together using retaining means 42 such as spot-bonding adhesive systems, discontinuous heat bonding, or the like, to provide the necessary physical shape and integrity, and also provide the interstitial spaces 41. Other forms including fanciful design shapes may also be made. The sorptive article of this embodiment may be used to wipe up spills or may be placed over a spill to take up the liquid and, as discussed in more detail below, may be reused after removing from the article the liquids that are taken up in sorbing the spill or body of liquid.

Unlike most sorptive materials used for large spills, the sorptive articles of the invention may be reused. The fibrous web components, e.g., when arranged in a linear orientation as in the first embodiment, allow the elements of the sorptive article to be manually or mechanically stripped of retained fluids by sequentially compressing the sorptive element from one end to the other, or otherwise squeezing or compressing the article comprising the fluid laden elements so as to effect disengagement of fluid therefrom. Compression by mechanical means may be employed to release a maximum amount of fluid when it proceeds from one end to the other of an elongate sorptive article, as for example of a type shown in FIGS. 1, 2, and 4 hereof. Although some fluids and/or particulate solids may remain in a previously-used, stripped sorptive article, the sorptive article may be profitably reused for additional liquid and/or solids removal at a high efficiency until the web materials wear out or the sorptive article otherwise is depleted or no longer suitable for its intended purpose.

Figure 5:
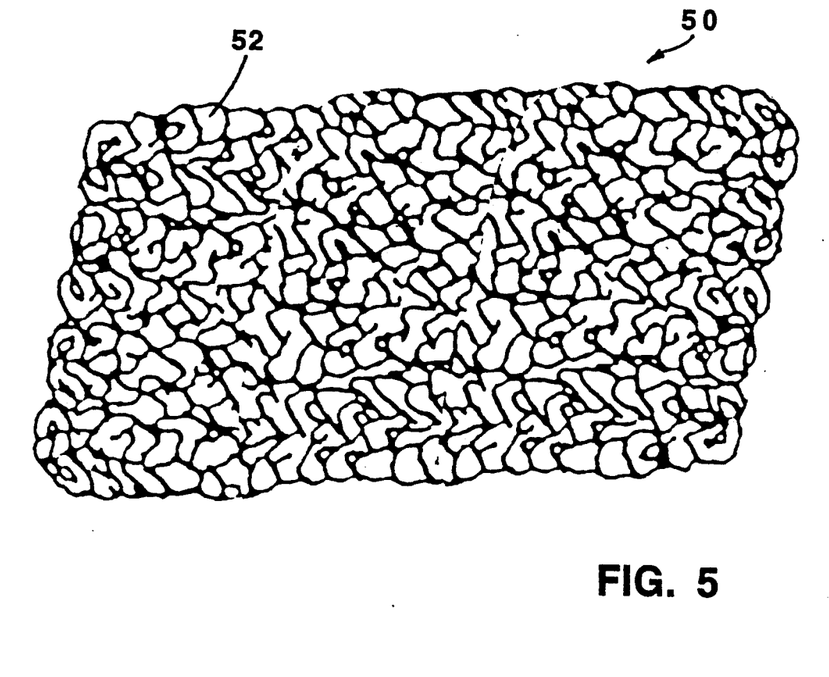
FIG. 5 is a perspective view of a mat or pillow article according to another embodiment of the present invention, featuring an assemblage of aggregated fibrous web elements.

FIG. 5 is a perspective view of a sorptive article 50 according to another embodiment of the invention, comprising an intertwined assemblage of fibrous web elements 52 forming the unitary structure shown.

Figure 6:
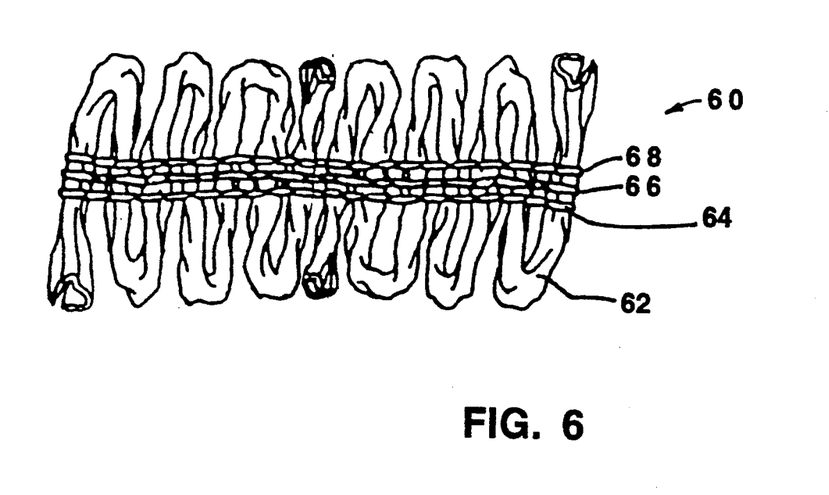
FIG. 6 is a perspective view of a sorptive article according to yet another embodiment of the invention, featuring a serpentinely disposed fibrous web element retained in a consolidated form by a triple stitching arrangement.

FIG. 6 is a perspective view of a sorptive article 60 according to another embodiment of the invention, comprising a serpentinely arranged fibrous web element 62 held in position with a triple stitch arrangement comprising stitch threads 64, 66, and 68.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A sorptive article comprising: (a) a unitary assemblage of fibrous web sorptive elements having capacitive spaces capable of holding fluid and/or particulate solids, said fibrous web sorptive elements comprising elongate web element strips to which involutions have been imparted; and
   (b) means for retaining said fibrous web sorptive elements in said unitary assemblage.

2. A sorptive article as claimed in claim 1 wherein the elongate web element strips have been differentially stressed to provide said involutions therein and form elongate web element strands having a reduced transverse dimension relative to said elongate web element strips.

3. A sorptive article as claimed in claim 2, wherein the unitary assemblage of fibrous web sorptive elements has a retaining means at both ends.

4. A sorptive article as claimed in claim 2, wherein the unitary assemblage of fibrous web sorptive elements as a retaining means on one end.

5. A sorptive article as claimed in claim 2, wherein the unitary assemblage of fibrous web sorptive elements extend as single continuous elements the length of said fluid-sorptive article.

6. A sorptive article as claimed in claim 1, wherein the elongate web element strips are arranged in linearly aligned fashion in said unitary assemblage.

7. A sorptive article as claimed in claim 1, wherein the fibrous elements comprise parallel sheets of fibrous material rolled together and held by a retaining means in said unitary assemblage.

8. A sorptive article as claimed in claim 1, wherein the fibrous sorptive elements comprise elongate web element strands formed by involutional stressing of elongate web element strips to form said strands having involutions therein providing capacitive spaces capable of taking up and retaining fluid and/or particulate solids, wherein the fibrous web sorptive elements are in an aggregated state with respect to one another.

9. A sorptive article as claimed in claim 1, wherein said fibrous web element comprises a nonwoven material selected from the group consisting of polyester, rayon, cotton, olefin, acrylics, wood pulp, and combinations thereof.

10. A sorptive article as claimed in claim 9, wherein the fibrous web element is comprised of 0% to 70% polyester and 30% to 100% of a substance selected from the group consisting of wood pulp, cotton, polyester, rayon, olefin, acrylics, and combinations thereof.

11. A sorptive article as claimed in claim 9, wherein the fibrous web element is comprised of approximately 55% polyester and approximately 45% of a substance selected from the group consisting of natural fibers, synthetic fibers, and combinations thereof.

12. A sorptive article as claimed in claim 9, wherein the fibrous web element is a hydro-entangled spunlaced fabric.

13. A sorptive article as claimed in claim 1, wherein said fibrous web element comprises a nonwoven web material comprising synthetic fibers.

14. A sorptive article as claimed in claim 1, wherein the article is flat and not elongated.

15. A sorptive article as claimed in claim 14, wherein each of the fibrous web elements is formed into a plurality of folded portions.

16. A sorptive article as claimed in claim 1, further comprising one or more foam pieces with the fibrous web elements.

17. A sorptive article comprising a unitary assemblage of fibrous web comprising web element strips which have been stressed to provide involutions therein and form elongate web strand elements of reduced transverse dimension relative to the elongate web element strips, with the involutions therein forming capacitive spaces capable of taking up and retaining fluids and/or particulate solids.

18. A sorptive article as claimed in claim 17, wherein the aggregated state comprises the fibrous web sorptive elements being in a condition selected from the group consisting of being matted, tufted, intertwined, interpenetrated, intertied, and spot-melt-bonded to one another.

19. A sorptive article according to claim 1, wherein said retaining means comprises an adhesive composition bonding at least some of said fibrous web sorptive elements in said assemblage to one another.

20. A sorptive article comprising a unitary assemblage of fibrous web sorptive elements, said fibrous web sorptive elements comprising elongate web element strands having involutions therein formed by differential stressing of elongate web element strips to a sufficient extent to permanently impart said involutions thereto and form elongate web element strands therefrom, with said strands having a reduced transverse dimension relative to said elongate web element strips.

* * * * *